United States Patent

[11] 3,578,758

[72] Inventor Thomas L. Altshuler
West Concord, Mass.
[21] Appl. No. 822,519
[22] Filed May 7, 1969
[45] Patented May 18, 1971
[73] Assignee The United States of America as represented by the Administrator of the National Aeronautics and Space Administration

[54] ORIFICE GROSS LEAK TESTER
3 Claims, 4 Drawing Figs.
[52] U.S. Cl. .................................................. 73/40.7, - 250/41.9(S)
[51] Int. Cl. .................................................... G01m 3/16
[50] Field of Search ............................................ 73/40.7, 40; 250/41.9 (A), (Inquired)

[56] References Cited
UNITED STATES PATENTS

| | | | |
|---|---|---|---|
| 3,126,734 | 3/1964 | Stutzman ..................... | 73/40.7X |
| 3,247,706 | 4/1966 | Rose et al. ..................... | 73/40.7 |

Primary Examiner—Louis R. Prince
Assistant Examiner—William A. Henry, II
Attorneys—John R. Manning and James O. Harrell ABSTRACT: An orifice leak tester for use with a helium mass spectrometer is disclosed. The leak tester comprises a sample chamber, wherein an article to be tested is supported on a wire screen; an orifice formed in a wall common to the sample chamber and mass spectrometer specimen chamber; and means for directing a purging gas over the orifice and through the sample chamber. A specimen pressurized with helium gas is introduced into the previously purged sample chamber. Helium gas effusing from a leaking specimen flows through the pressure limiting orifice and is detected by the spectrometer.

INVENTOR
THOMAS L. ALTSHULER

BY
Herbert E. Farmer
ATTORNEYS 3,578,758

ORIFICE GROSS LEAK TESTER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates to the testing of articles for leaks. More specifically, this invention is directed to improvements in apparatus for conducting leak tests, and particularly to the testing of articles for gross leaks. Accordingly, the general objects of the present invention are to provide novel and improved methods and apparatus of such character.

2. Description of the Prior Art

While not limited thereto in its utility, the present invention is particularly well suited to the testing of encapsulated semiconductor devices for leaks. As is well known, many semiconductor devices, and particularly integrated circuits, are adversely affected by the presence of a few parts per million of water. Semiconductor devices must, therefore, be hermetically sealed in order to prevent exposure of the semiconductive material to water vapor. Typically, either one or a plurality of semiconductor devices will be sealed within a "TO-can" and it is necessary to conduct leak tests on such packaged devices to insure that the containers are hermetically sealed. If, in testing, an integrated circuit package has a leak rate of less than $5 \times 10^{17}$ std. cc./sec. it is considered hermetic.

Leak tests may be divided into two categories. The first type of test is the gross leak test wherein leak rates greater than $10^{15}$ cc./sec. are detected. The second category of test is the fine leak test wherein detection of leak rates less than $10^{15}$ cc./sec. are detected.

In the prior art, a great deal of difficulty has been encountered in attempting to conduct gross leak tests. Thus, prior art gross leak tests have typically comprised some form of "bubble" test wherein the device to be tested was first immersed in a pressurized gas atmosphere and thereafter submerged in a suitable liquid and visually inspected for the formation of bubbles indicative of a leak. Such "bubble" tests have the obvious disadvantage that, due to their inexactness, leaks too small for the formation of visibly observable bubbles and yet too large for detection by fine leak test methods, as will be described below, will not be noted. Further, "bubble" tests are subject to human error and entrapped gases on the surface of the article being tested often form bubbles or the testing fluid may degas resulting in either case in the rejection of "good" devices. The encapsulated devices may themselves be damaged if the leak is sufficiently gross to permit see page of the test chamber fluid into the device container.

The most widely accepted technique in the prior art for conducting tests for fine leaks comprises the helium leak test. The helium leak test consists of pressurizing the devices to be tested in a helium atmosphere, flushing the devices with dry nitrogen to remove absorbed helium and thereafter testing each device in a mass spectrometer leak detector. Such mass spectrometer leak detectors are based on the technology disclosed in U.S. Pat. No. 2,486,199 issued Oct. 25, 1949 to Alfred O. Nier.

For the reasons to be described briefly below, helium tests are limited to detecting leak rates between $10^{15}$ and $10^{1}$ std. cc/sec. The smaller leak rate limitation, of course, presents no problem in determining the hermetic condition of an encapsulated device. However, the faster leak rate limitation has previously precluded the use of helium leak tests for gross leak testing.

SUMMARY OF THE INVENTION

The present invention overcomes the above and other disadvantages of the prior art and in so doing provides novel methods and apparatus for employing helium mass spectrometer leak testing to the detecting of gross leaks in containers. In accomplishing the foregoing, the present invention contemplates an orifice leak test wherein communication between the article being tested and the leak tester specimen chamber is via an orifice.

The present invention thus comprise apparatus which may be mounted in the specimen chamber of a helium leak detector; the invention defining a sample chamber separated from the leak tester specimen chamber via an orifice which is designed to limit the gas flow between the sample and specimen chambers to a rate that can be handled by the mass spectrometer high vacuum pump. Also in accordance with the present invention, the vacuum in the mass spectrometer is maintained within the tolerable region necessary for accurate mass spectrometer readings and the sample chamber remains at substantially atmospheric pressure during the period of communication between the specimen chamber and mass spectrometer.

The present invention is also characterized by provision for purging the sample chamber between tests to both prevent contamination of the orifice, to remove the possibility of inaccurate tests due to the detection of helium remaining in the specimen chamber from a prior text.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGS. and in which.

DESCRIPTION OF THE PREFERRED EMBODIMENT

Figure 1:
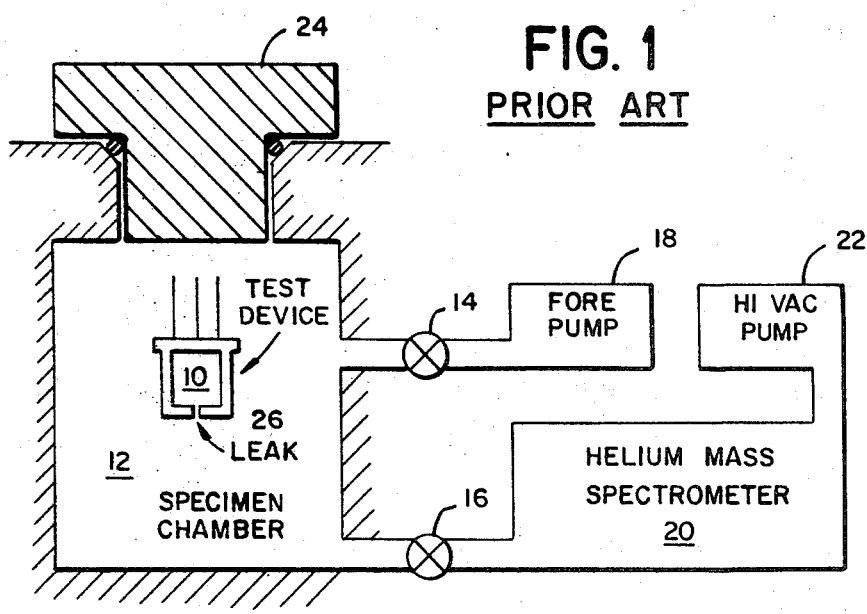
FIG. 1 schematically shows a prior art helium leak detector.

As a background for understanding and appreciating the mode of operation, the structure, and the results obtained from the present invention, it is well to first consider the reason why gross leak tests cannot be conducted in a prior art type of mass spectrometer leak detector such as is shown in FIG. 1. In the helium leak test an article or device 10 which is to be tested for hermetic sealing is, after having been pressurized in a helium atmosphere at 45—60 p.s.i.g. for 2 to 5 hours, inserted into a specimen chamber indicated generally at 12. When the device 10 is inserted in the chamber 12, a pair of valves 14 and 16 will be closed, a rotary fore pump 18 will be operating and a mass spectrometer 20 will remain evacuated at pressures less than 0.2 microns through the action of a high vacuum pump 22. It is, of course, necessary to limit the pressure in the mass spectrometer apparatus to less than 0.2 microns in order to prevent burning out of the filament in the apparatus. After the device 10 has been inserted in the chamber 12 and the chamber sealed from the atmosphere by a cap 24, the valve 14 will be opened and the rotary pump 18 will evacuate the chamber 12 to a pressure of 1—2 microns. If the leak in the article 10 is a fine leak 26, the pressure within the article remains nearly constant during this initial pump down step. When the desired test chamber pressure is achieved, the valve 14 will be closed, the valve 16 opened and the high vacuum pump 22 will evacuate the chamber 12 through the helium mass spectrometer 20. In the case of a fine leak, the pressurized helium within the article will be forced through the leak and will be detected by the mass spectrometer. However, in the case of a gross leak, by the time the valve 16 is opened, the device 10 will have been evacuated to a pressure approaching that existing in the chamber 12. Consequently, there will be little or no helium left in the article 10 to be detected by the spectrometer 20 upon opening of the valve 16 and thus reliable testing is precluded.

Figure 2:
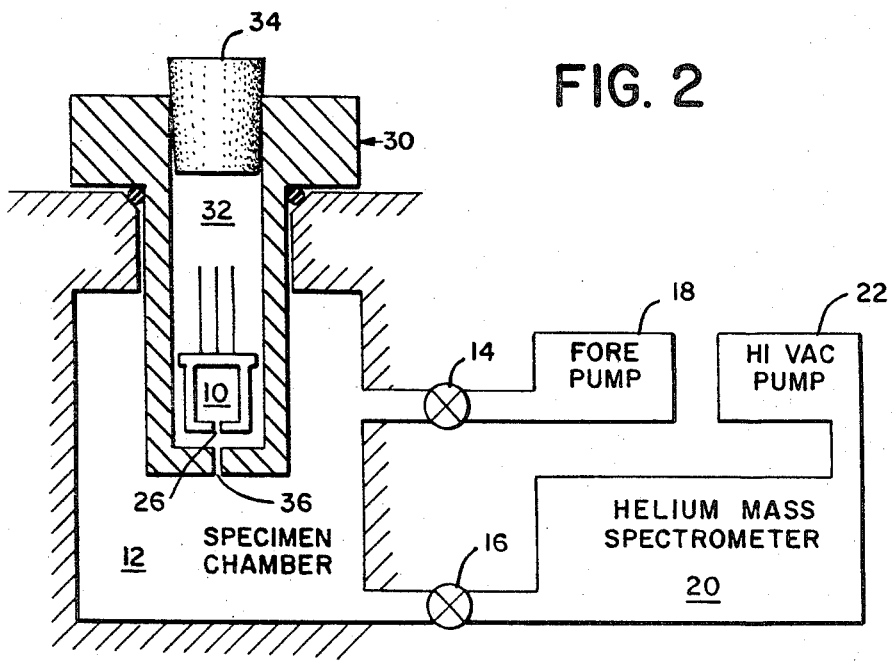
FIG. 2 is a schematic drawing which illustrates the principles of operation of the present invention.

As previously noted, the present invention is well suited for use in the testing of encapsulated semiconductor devices in order to insure hermetic sealing thereof. Typically, semiconductor devices will be supported on a nonconductive substrate and mounted within a container such as the common TO5 can. In FIGS. 1 and 2 the article 10 being tested represents a TO5 can having a gross leak therein as indicated by a hole 26. The apparatus schematically illustrated in FIG. 2 is identical to that of FIG. 1 with the exception that the specimen chamber cap 24 of FIG. 1 has been replaced by an orifice leak tester indicated generally at 30.

The orifice leak tester 30 defines a sample chamber 32 into which the article (can) being tested is disposed. The open end of the test device 30, through which the article 10 is inserted, is sealable by means of a suitable plug 34 and a controlled leak of gas from within the chamber 32 and the can 10 into the specimen chamber 12 will occur through an orifice 36 disposed in a wall common to both the chambers 12 and 32. The orifice 36 is of such size that the gas flow therethrough is the maximum that can be handled by the high vacuum pump 22 while maintaining the vacuum in the tolerable region necessary for accurate mass spectrometer readings. However, due to the restricted communication between the sample chamber 32 and the specimen chamber 12, the pressure within the chamber 32 will normally remain at or near atmospheric.

In operation of the system shown in FIG. 2, the specimen chamber 12 is continuously evacuated by a high vacuum pump 22. The article 10, which previously has been subjected to helium pressurization and stored in a suitably sealed container, will be inserted in the sample chamber 32 and the chamber sealed with the plug means 34. The sample chamber 32 should, previous to insertion of the article 10 therein, be purged with a gas other than helium. If there is a gross leak in the can 10, some helium gas will diffuse from the leak into the sample chamber 32 mixing with other gases present therein. Some of the mixture in the chamber 32 will be drawn through the orifice 36 into the specimen chamber 12 and any helium present in the mixture which passes through the vale 16 into the mass spectrometer 20 will be detected by the mass spectrometer.

Figure 3:
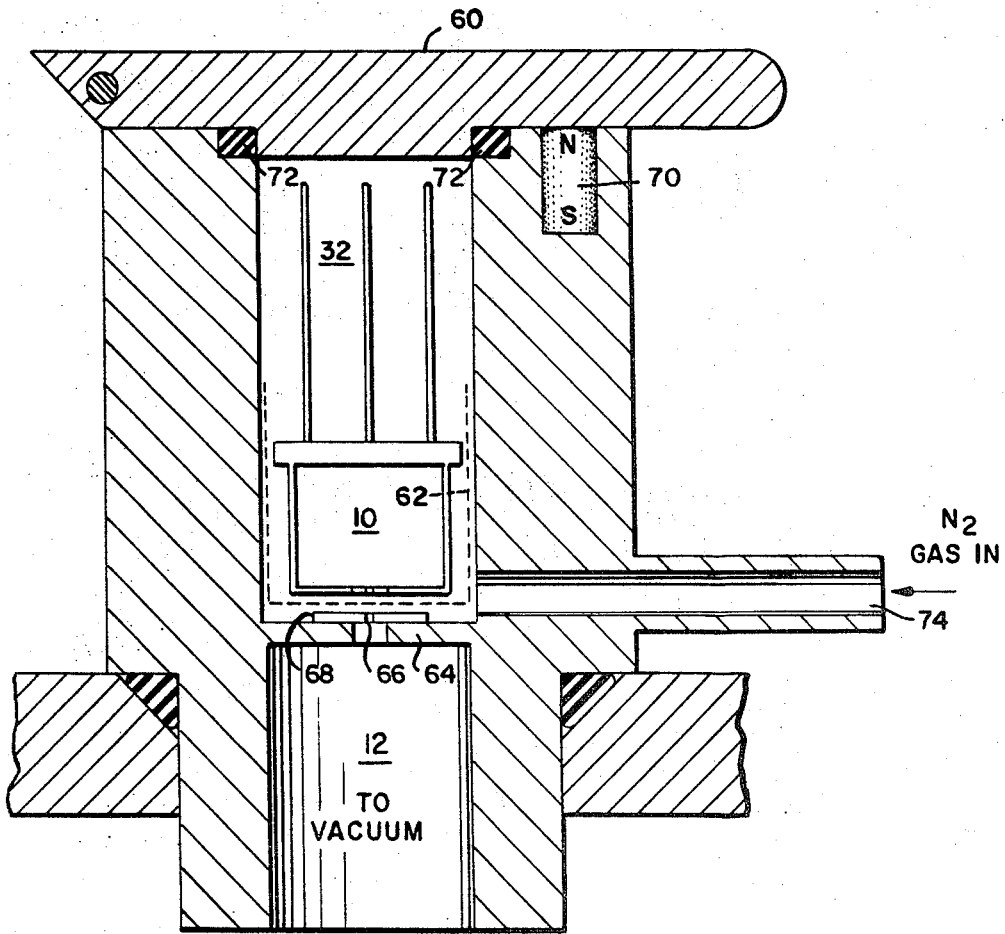
FIG. 3 is a side elevation view, partially in section, of first embodiment of the present invention.
Figure 4:
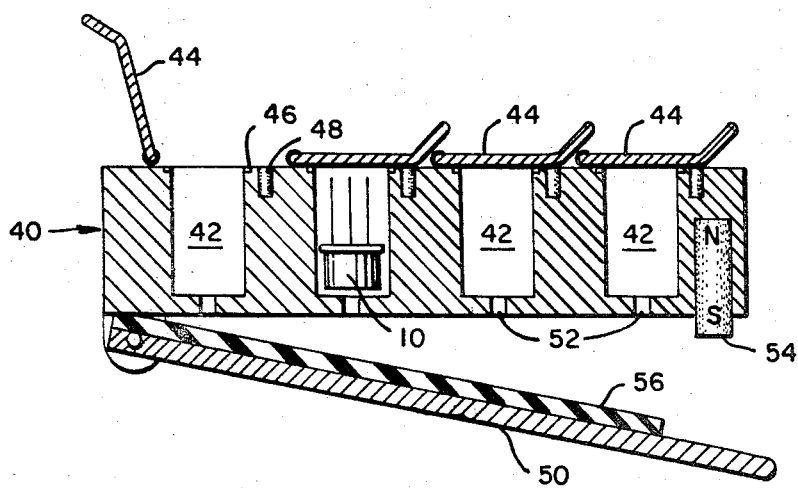
FIG. 4 is a cross-sectional, side elevation view of a fixture for storing pressurized articles prior to leak testing in accordance with the present invention.

From the foregoing description of FIG. 2, the general theory of operation of the present invention may be understood. The actual structure of preferred embodiment of leak tester 30 is shown in FIG. 3. However, before discussing this embodiment, the storage jig of FIG. 4 will be described. The apparatus of FIG. 4 comprises a body, indicated generally at 40, which defines a plurality of storage cups 42. In actual practice body 40 should contain at least 100 storage cups 42. Each of the cups 42 is provided with a hinged top lid 44. The articles to be tested, such as the cans 10, are dropped into the cups 42 and, when all of the cups 42 are filled, the individual hinged lids 44 are caused to close. A plurality of suitable seals, such as O-ring 46, are provided around the entrance to each of the cups 42 and, when the lids 44 are closed, they will be held in position and the seals 46 compressed by means of a plurality of permanent magnets 48.

After loading of the cups 42, and with a lower hinged door structure 50 in the open position as shown, the storage jig 40 will be subjected to an atmosphere of helium at a pressure of approximately 60 p.s.i.g. for 2 hours. Helium will enter each of the cups 42 through a corresponding plurality of relatively small diameter openings 52 in the bottoms thereof and, should any of the cans 10 have a leak therein, helium will seep into the interior thereof. At the termination of the pressurization cycle, the lower door 50 will be closed and will be held in the closed position by a magnet 54. The sealing of the openings 52 is assured by a compressible sheet of sealing material 56 which is suitably mounted on the inside of the door 50.

When it is desired to perform leak tests on the individual cans 10, the lids 44 will be opened singly and the pressurized cans removed therefrom and inserted in the sample chamber 32 of the leak tester of FIG. 3. It is to be noted that the transfer of the cans 10 to the sample chambers may be accomplished manually or automatically.

Considering now FIG. 3, a preferable version of the orifice leak tester 30 of FIG. 2 is depicted. In the FIG. 3 embodiment, a diaphragm 68 defines an orifice 66 which provides communication between sample chamber 32 and the specimen test chamber 12 of the helium leak tester. Diaphragm 68 consists of a sheet of metal, typically brass, approximately 0.001 inches thick. Tests have shown that the diameter of the orifice 66 should be about 0.1 micron. While the diaphragm 68 will typically be soldered to a wall 64 which is common to both the specimen chamber 32 and the test chamber 12 of the detection system (not shown), other means which will more readily permit diagram replacement should the orifice become clogged may be provided to hold the diaphragm in place.

The apparatus of FIG. 3 further comprises a hinged lid 60 which is held in the closed position by a magnet 70. An O-ring seal 72 between the lid and shoulder on the walls of the chamber 32 may be dispensed with in favor of a metal-to-metal contact in order to eliminate helium gas absorption by the seal.

A fine screen 62 is mounted from the wall of chamber 32 and extends over the orifice in order to prevent large dirt particles from falling upon the orifice. A dry purging gas other than helium, such as nitrogen, enters through an inlet tube 74, the gas flow being controlled at the source, not shown. Since chamber 32 will be purged each time a new article is to be tested, clogging of the orifice 66 is unlikely in view of the repeated flow of the purging gas across the upper surface of the diaphragm 68. The advantages of this embodiment over the one shown in FIG. 2 is that a means of purging the chamber 32 is provided for use between tests. Furthermore, the danger of plugging the orifice is reduced greatly.

To summarize the novel design criteria of the present invention, the length of the path that the helium travels between a possible leak in an article being tested and the orifice in the leak tester is short as compared to the cross-sectional area of the path. The foregoing is required in order to reduce the diffusion time for helium to pass from the article to the orifice thereby maximizing the effective sensitivity of the tester. Also, the orifice is of such a shape that helium entering the orifice will flow through the orifice at a sufficiently rapid rate so that the response time of the test is not increased. This ordinarily means that the gas flow through the orifice is viscous in nature rather than diffusional. Also, the orifice size is such that the gas flow rate therethrough is close to the maximum rate that the high vacuum pump on the spectrometer can handle and still keep the spectrometer pressure within its proper operating range. To maximize the sensitivity of the tester, the sample chamber is designed so as to have a volume which is only slightly larger than the articles to be tested therein. However, this volume should be sufficiently large so that all the gas therein will not be evacuated at a rate exceeding the response and effective recording time of the mass spectrometer. In this regard, it is to be noted that the pressure in the sample chamber 32 may be any value, the sensitivity of the tester being proportional to the absolute pressure. However, the rate of change of pressure in the sample chamber should be sufficiently low to guard against large errors being introduced by the response time of the mass spectrometer. Similarly, the ratio of the volume of the sample chamber to that of the sample must be compatible with the requirement that the helium path length be small compared to the cross-sectional area of the path.

While a workable embodiment has been shown and described, various modifications and substitutions may be made thereto without departing from the spirit and scope of the present invention. For example, the present invention might be combined with suitable automatic equipment and valving to permit automatic gross leak testing followed by fine leak testing. That is, through the use of suitable valving, the sample chamber 32 may be pumped down to the pressure of the mass spectrometer following a gross leak test and a fine leak test performed in the manner of the prior art; the orifice having no noticeable effect with the pressures equalized in the sample and specimen chambers. Also, the storing fixture can be modified so that devices that have been pressurized with helium can then be placed in storage cups previously purged free of helium. The devices would then remain in the cups for a sufficient period of time so that leaking devices would effuse sufficient helium in the cups. Then the storing fixture could be mounted upon an orifice leak tester without a sample chamber 32. The storage fixture and orifice leak tester would be designed so that each cup could be sequentially connected to the orifice in order to sample the gas within the cup. This process has the advantage of elimination of the fine leak test, the magnitude of the leak being measured directly upon the mass spectrometer. Furthermore, this process would permit very rapid testing.

I claim:

1. Apparatus for testing for leaks in articles, said apparatus being intended for use in combination with suitable equipment for detecting a selected gas and the articles to be tested being subjected to a pressurized environment comprising said detection gas prior to testing, said apparatus comprising:
   A. a test chamber means communicating with the detection equipment;
   B. means defining a sample chamber having a large area opening in a first wall portion thereof through which pressurized articles to be tested may be inserted;
   C. means for sealing said opening after test article insertion;
   D. orifice defining means in a second wall portion common to both said sample chamber defining means and said test chamber, said orifice means providing a fluid communication path of substantially minimal length between said sample chamber and said test chamber;
   E. means for purging said sample chamber with a gas to which the detection equipment is nonresponsive subsequent to the insertion of articles into said sample chamber; and
   F. a screen mounted in said sample chamber for supporting the test articles above said orifice defining means.

2. Apparatus for testing for leaks in articles, said apparatus being intended for use in combination with suitable equipment for detecting a selected gas and the articles to be tested being subjected to a pressurized environment comprising said detection gas prior to testing, said apparatus comprising:
   A. a test chamber means communicating with the detection equipment;
   B. means defining a sample chamber having a large area opening in a first wall portion thereof through which pressurized articles to be tested may be inserted;
   C. means for sealing said opening after test article insertion;
   D. orifice defining means in a second wall portion common to both said chamber defining means and said test chamber, said orifice means providing a fluid communication path of substantially minimal length between said sample chamber and said test chamber;
   E. means for purging said sample chamber with a gas to which the detection equipment is nonresponsive subsequent to the insertion of articles into said sample chamber;
   F. an aperture in said second wall portion; and
   G. a diaphragm bridging said aperture and having a small diameter hole therein.

3. Apparatus for testing for leaks in articles, said apparatus being intended for use in combination with suitable equipment for detecting a selected gas and the articles to be tested being subjected to a pressurized environment comprising said detection gas prior to testing, said apparatus comprising:
   A. a test chamber means communicating with the detection equipment;
   B. means defining a sample chamber having a large area opening in a first wall portion thereof through which pressurized articles to be tested may be inserted;
   C. means for sealing said opening after test article insertion;
   D. orifice defining means in a second wall portion common to both said sample chamber defining means and said test chamber, said orifice means providing a fluid communication path of substantially minimal length between said sample chamber and said test chamber;
   E. means for purging said sample chamber with a gas to which the detection equipment is nonresponsive subsequent to the insertion of articles into said sample chamber;
   F. an aperture in said second wall portion;
   G. a diaphragm bridging said aperture and having a small diameter hole therein; and
   H. said hole in said diaphragm is of such size and shape that viscous flow therethrough of the gas to be detected will occur, said flow being at a rate whereby the pressure in the detection equipment will remain in its operating range and a sufficient amount of detection gas to enable testing will remain in said sample chamber after a period equal to the response time of the detection equipment.